(12) United States Patent
Calello

(10) Patent No.: US 6,506,967 B1
(45) Date of Patent: Jan. 14, 2003

(54) PRERECORDED MUSICAL ARRANGEMENT TEACHING ASSEMBLY AND METHOD

(76) Inventor: Patrick M. Calello, 421 Bloomfield Ave., Newark, NJ (US) 07107

( * ) Notice: Subject to any disclaimer, the term of this patent is extended or adjusted under 35 U.S.C. 154(b) by 35 days.

(21) Appl. No.: 09/590,216

(22) Filed: Jun. 8, 2000

Related U.S. Application Data

(63) Continuation-in-part of application No. 08/144,427, filed on Nov. 2, 1993, now abandoned.

(51) Int. Cl.$^7$ ............................................... G09B 15/00
(52) U.S. Cl. ..................................... 84/470 R; 434/319
(58) Field of Search ........................... 84/470 R, 470 P, 84/461, 462, 466; 434/319

(56) References Cited

U.S. PATENT DOCUMENTS

| | | | | |
|---|---|---|---|---|
| 2,153,027 A | * | 4/1939 | Ross | |
| 3,919,913 A | * | 11/1975 | Shrader | 84/470 R X |
| 3,955,466 A | * | 5/1976 | Goldmark | 84/470 R |
| 4,018,127 A | * | 4/1977 | Biro | |
| 4,441,399 A | * | 4/1984 | Wiggins et al. | 84/470 R |
| 4,732,072 A | * | 3/1988 | Garlock | 84/470 R |
| 5,052,264 A | * | 10/1991 | Dueweke | 84/470 P |
| 5,439,382 A | * | 8/1995 | Pettinichi | 434/319 |
| 5,525,062 A | * | 6/1996 | Ogawa et al. | 434/318 X |

OTHER PUBLICATIONS

Ex parte S. (Board of Appeals) Aug. 4, 1943 (case #109), 25 Journal of the Patent Office Society 904.*

\* cited by examiner

*Primary Examiner*—Jeffrey Donels
(74) *Attorney, Agent, or Firm*—Anthony J. Casella; Gerald E. Hespos

(57) ABSTRACT

A method is provided for training different members of a musical group to perform a selected rendition of a musical work. The method comprises providing a pre-recorded media with a plurality of tracks relating to the musical work. One track includes a professional group performing their rendition of the musical work. At least one additional track emphasizes a particular performer, while de-emphasizing the other performers of the professional group. At least an additional track de-emphasizes a particular performer, while emphasizing the other performers. The pre-recorded media is employed in accordance with the method by first playing the track with all members performing so that the member of the musical group can determine how the musical work should sound. Next, the member of the musical group listens to the track that emphasizes his or her performance to learn specifically how that performance should sound. The roles of the other performers can be de-emphasized. Next, a track is played which de-emphasizes the particular performer, while permitting the other performers to perform at a normal level. During this track, the performer can perform his or her own part simultaneously with the professional performers.

12 Claims, 1 Drawing Sheet

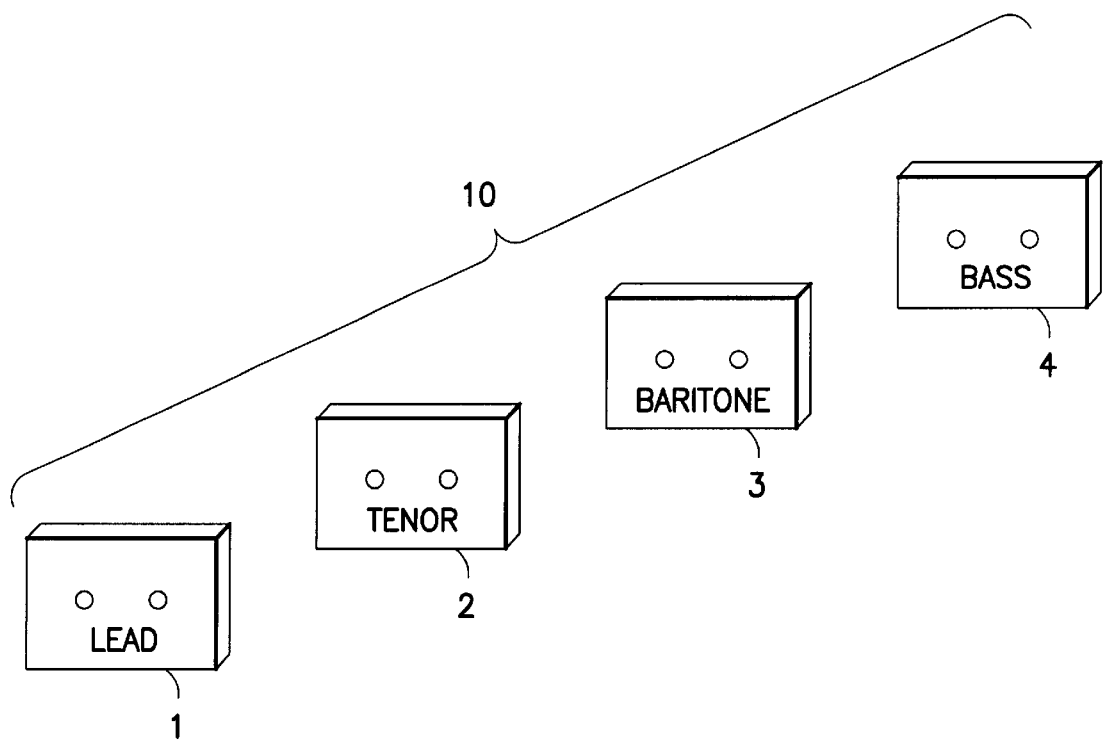

PRERECORDED MUSICAL ARRANGEMENT TEACHING ASSEMBLY AND METHOD

This application is a continuation-in-part and claims the benefit of U.S. patent application Ser. No. 08/144,427 filed Nov. 2, 1993 now abandoned.

BACKGROUND OF THE INVENTION

1. Field of the Invention

The subject invention relates to an apparatus and method for teaching a cappella singing to the various members of an a cappella singing group.

2. Description of the Prior Art

The English language translation for the Italian phrase a cappella is "as chapel", and refers to the singing that had been performed in churches without the benefit of musical accompaniment. Today the term a cappella is used to describe a style of popular music, and typically 1950's style music, that is sung without musical accompaniment.

An a cappella singing group typically will include four singers, namely a lead singer, a tenor or alto, a baritone and a bass. Each of the singers has a specific role in the a cappella musical performance, and the respective roles must be carefully orchestrated relative to one another. Each a cappella singer must know his or her own part as well as how each singer's part coordinates with the parts of other singers in the group. Most a cappella singing groups acknowledge that 8–10 hours of practice are required for each new song.

A cappella singing groups exist on many college campuses and are associated with many clubs outside the academic world. These groups perform for their own enjoyment and for the enjoyment of others at various social functions. One of the difficulties faced by a cappella singing groups is the time required for learning a new song and practicing songs that are part of the group's repertoire. In particular, individual singers in an a cappella group seldom can coordinate their free time to achieve the 8–10 hours of required to perfect a new song.

The prior art includes various systems that are intended to enable one part of a musical group to perform independently of other parts. For example; the prior art is replete with examples of Karoake systems where a singer provides the vocal accompaniment for prerecorded instrumental music. Most prior art Karoake systems include a video accompaniment which displays the lyrics of a song on a screen at the appropriate time for the singer. Karoake systems are of little benefit to a cappella groups which, by definition, perform without instrumentation. Additionally, Karoake systems provide little or no assistance to singers who are trying to learn how one musical part coordinates with the musical parts performed by other singers in the a cappella group.

U.S. Pat. No. 3,955,466 is directed to a system employing prerecorded magnetic tapes for teaching various parts in a musical score, a play or a vocal performance. The tape includes a first track with an ensemble rendition of the program with a particular part of the program omitted from the prerecorded ensemble rendition. A control track is provided with control signals representative of preselected stop locations. A third track on the tape is provided for a student to perform a version of the omitted performance. A fourth track includes an exemplary performance of the omitted performance, such as one performed by a professional or teacher. The four track system employed in U.S. Pat. No. 3,955,466 is roughly comparable to a four-lane highway, with each lane simultaneously carrying a different array of traffic. More particularly, the system disclosed in U.S. Pat. No. 3,955,466 requires special recording equipment to record the original tape to be used as a teaching tool, and special costly recording/play back equipment to be used by the student to enable the student to record his or her own performance on a separate one of the tracks while the ensemble track is playing. Conventional tape recording and play back equipment could not utilize the complex teaching of U.S. Pat. No. 3,955,466.

U.S. Pat. No. 5,439,382 relates to a method of teaching a multi-part musical composition. The method is directed to employing a first part of a musical composition at a first volume level and then superimposing on the first part a second part that is recorded at a louder volume than the first part. The louder second part is intended to be listened to and learned.

Accordingly, it is an object of the subject invention to provide an apparatus and method to enable efficient training of a cappella singing group without the need for complex, costly special equipment.

SUMMARY OF THE INVENTION

The subject invention is directed to a system of tapes that can be used with conventional tape recording/play back equipment. More particularly, the system may comprise four separate and distinct tapes for use respectively by a lead singer, a tenor/alto singer, a baritone singer and a bass singer in an a cappella group. Each system of four tapes preferably is dedicated to a single song that is to be learned and practiced by the a cappella group. Each tape in the system includes three sequential recordings on at least one side of the tape, and preferably three sequential recordings on both sides of the tape.

The first recording on the first side of each tape will be a rendition of the selected song by a professional a cappella group, with all members of the professional group singing their respective parts. Thus, the first recording on the first side of each tape will be identical for all four tapes.

The second recording on the first side of each tape will be different for each of the four tapes. More particularly, the second recording on the first side of each tape will be a professional singer singing the particular part to which that tape is dedicated, with the remaining singers in the a cappella group singing at a reduced volume. Thus, the tape dedicated to the lead singer of the a cappella group will have a second recording on the first side of a professional lead singer performing the lead part of the selected song. The other three singers in the a cappella group are audibly detectable on the second recording on the first side of the tape, but are at a lower volume. Similarly, the tape intended for the tenor/also will have the second recording on the first side be of a tenor/alto in a professional a cappella group performing his or her part. Remaining singers of the group are audibly detectable in the second recording of the first side, but at a lower volume. The second recording on the first side of the other two tapes in the system will have comparable recordings of the professional baritone and bass singers. This second recording on each tape in the system enables each of the singers in an a cappella group to learn his or her part and to know how his or her part fits into the parts being sung by the other singers in the a cappella group.

The third recording on each tape in the system also is different from the third recording in each other tape in the system. More particularly, the third recording on the first side of each tape will include every part of the group minus the louder part on the second recording of that tape.

However, the three parts in the second recording of each tape will be at a conventional volume, rather than the reduced volume of those same parts in the second recording. The third recording on each tape enables each singer in the a cappella group to practice singing his or her part at the appropriate time with the other singers in the group.

Each tape may end when the first recording on each side has terminated. Conversely, each tape may include an audible indicator at the end of the third recording for instructing the aspiring a cappella singer to flip the tape. The second side of each tape will have the same series of three recordings. However, the recordings will be ordered on the second side to have recording 2, recording 3 and recording 1 in sequence. Thus, the user of any tape in the system may simply flip the tape over at the end of recording 3 on side 1. The user may then listen to recording 2 which had been his or her part at a loud volume simultaneously with the other parts at a reduced volume. After listening to this recording 2 on the second side of the tape, the user then will hear recording 3 which permits the user to sing his or her part simultaneously with the professional a cappella group singing the other three parts of the selected song. The final song on the second side will be the entire professional group singing the selected song.

The subject invention also is directed to a method for teaching music to an a cappella group employing a plurality of identical compact discs. Each disc would include a first track having all four performers performing as they normally would for a group performance. This track of the compact disc can be created by superimposing four recordings of the individual performers at substantially identical or comparable volume levels. The first track may be followed by four separate tracks that respectively emphasize each of the four performers while de-emphasizing the other three performers. Thus, the second track may emphasize the lead singer, while de-emphasizing the tenor, baritone and bass. The third track could emphasize the tenor, while de-emphasizing the lead, baritone and bass. The fourth track could emphasize the baritone while de-emphasizing the lead tenor and bass, and the fifth track could emphasize the bass while de-emphasizing the lead, tenor and baritone.

The above-described first five tracks then may be followed by four additional tracks that de-emphasize only one of the performers, while allowing the playing of the other three performers at a normal level relative to one another. For example, the sixth track on the CD could de-emphasize the lead while playing the tenor, baritone and bass at the same relative level to one another and at a louder level than the de-emphasized lead performer. The seventh track could de-emphasize the tenor, while permitting the lead, baritone and bass to perform at their normal levels. The eighth track could de-emphasize the baritone and the ninth track could de-emphasize the bass. The compact disc then may end with a tenth track that is identical to the first track and that has all four performers recorded simultaneously and at substantially identical volume levels.

As described above, the compact disc would have the second through fifth tracks emphasizing a single performer and the sixth through ninth tracks de-emphasizing a single performer. A variation of this format could have the track that emphasizes a specific performer followed immediately by the track that de-emphasizes that performer's part. This latter format would reduce the amount of track switching during the learning process.

The learning method would use the compact disc in a manner similar to the method described with respect to the audio cassettes. In particular, four identical compact discs could be provided respectively to the four members of the a cappella group. Each member of the group then would learn a particular song by first listening to a track having all professional performers perform, second listening to a track that emphasized his or her particular part, third listening to a track that de-emphasize his or her particular part so that the performer could practice performing with the professional performers, and finally, at the option of the particular performer, listening to a final track with all professional performers singing properly together and at the same relative volumes. The method may proceed by repeatedly switching between the track that emphasizes the performance of a particular performer followed by the track that de-emphasizes that performance so that the performer could perform to replace the de-emphasized performance.

The method of the subject invention has been described with respect to embodiments that employ audio tapes and compact discs. However, the method also can employ a personal computer connected to the Internet. The respective parts described above can be downloaded from the Internet directly to a particular performer in a group. Thus, a member of a group would only have to download three tracks, namely a track with all four performers performing at an identical volume level, a track with a particular performer's part emphasized and a final track with the particular performer's part de-emphasized. The performer then could employ controls on the personal computer to selectively switch back and forth between the three downloaded tracks. Alternatively, all tracks could be downloaded simultaneously. The downloaded information could then permit the performer to identify a part of interest and then could permit the sequential playing of tracks relating to the performer of interest, as described above. In either the compact disc version or the second above-described embodiment of the downloaded version, any performer could listen to the tracks intended for other performers to learn what the other performers are trying to achieve. This would be particularly helpful for the member of the group who is trying to lead the practice and learning sessions.

BRIEF DESCRIPTION OF THE DRAWING

The FIGURE is a perspective view of the four tapes of a system of tapes for teaching an a cappella rendition of a single song.

DETAILED DESCRIPTION OF THE PREFERRED EMBODIMENT

The system of tapes in accordance with the subject invention is identified generally by the numeral 10 in the FIGURE. The system of tapes then is used to teach each member of an a cappella singing group an a cappella rendition of a particular single song. The system 10 of tapes includes a first tape 1 for the lead singer of the group, a second tape 2 for the tenor or alto singer of the group, a third tape 3 for the baritone singer of the group and a fourth tape 4 for the bass singer of the group.

Each tape 1–4 in the system 10 is different from each other tape 1–4 in the system 10. The differences between the respective tapes can be explained most easily with reference to the accompanying Table. As illustrated in Table 1, each tape 1–4 includes three recordings on side one and three recordings on side 2. Each recording on each tape 1–4 presents a selected combination of different parts of a rendition of the selected song performed by a professional a cappella group. As presented in Table 1, parts presented in uppercase letters in Table 1 are intended to indicate normal volume. Parts presented in lowercase letters in Table 1 are intended to indicate an audible but significantly reduced volume.

With further reference to Table 1, tape 1 is the tape intended for the lead singer of the a cappella group. The first recording on the first side of tape 1 includes all four members of the professional a cappella group singing at the proper volume. This recording enables the lead singer of the aspiring a cappella group to learn how the entire group should sound when performing the selected song. The second recording on the first side of tape 1 presents the lead singer of the professional group performing his part in the

TABLE 1

|  | TAPE 1 | TAPE 2 | TAPE 3 | TAPE 4 |
|---|---|---|---|---|
| SIDE 1 RECORDING 1 | LEAD TENOR BARITONE BASS | LEAD TENOR BARITONE BASS | LEAD TENOR BARITONE BASS | LEAD TENOR BARITONE BASS |
| SIDE 1 RECORDING 2 | LEAD tenor baritone bass | lead TENOR baritone bass | lead tenor BARITONE bass | lead tenor baritone BASS |
| SIDE 1 RECORDING 3 | TENOR BARITONE BASS | LEAD BARITONE BASS | LEAD TENOR BASS | LEAD TENOR BARITONE |
| SIDE 2 RECORDING 1 | LEAD tenor baritone bass | lead TENOR baritone bass | lead tenor BARITONE bass | lead tenor baritone BASS |
| SIDE 2 RECORDING 2 | TENOR BARITONE BASS | LEAD BARITONE BASS | LEAD TENOR BASS | LEAD TENOR BARITONE |
| SIDE 2 RECORDING 3 | LEAD TENOR BARITONE BASS | LEAD TENOR BARITONE BASS | LEAD TENOR BARITONE BASS | LEAD TENOR BARITONE BASS | selected song at a normal volume, while the tenor/alto, the baritone and the bass singers of the professional group are presented at a significantly reduced but audible volume. This second recording on the first side of tape 1 enables the aspiring lead singer to learn his part and to learn how his part will related to the various parts being sung simultaneously by the other three members of the group.

The third recording on the first side of tape 1 provides the tenor/alto, the baritone and the bass of the professional group singing at normal volume without the lead singer. This recording enables the lead singer of the aspiring group to sing the part learned in the second recording while harmonizing with the tenor, baritone and bass singers of the professional group.

Upon completion of the third recording on the first side of tape 1, the lead singer will hear an audible tone indicating that it is time for the lead singer to flip tape 1 over to the second side. Alternatively, the lead singer may infer that it is time to flip tape 1 by the absence of further recording on the first side.

The first recording on the second side of tape 1 will be the same as the second recording of the first side of tape 1. More particularly, the first recording on the second side of tape 1 will have the professional lead singer performing the selected song at normal volume, while the tenor/alto singer, the baritone singer and the bass singer of the professional group sing at a discernibly lower volume. Thus, after just having sung his part with the professional tenor/alto singer, the professional baritone singer and the professional bass singer, the aspiring lead singer may immediately listen to the professional lead singer and may, if desired, sing along with the professional lead singer.

The second recording on the second side of tape 1 is the same as the third recording on the first side of tape 1. Thus, the aspiring lead singer will hear the professional tenor/alto, baritone and bass singers perform the selected song without the benefit of the professional lead singer. Thus, the aspiring lead singer may sing the lead part with the tenor/alto, baritone and bass singers of the professional group. The final recording on the second side of the tape is the same as the first recording on the first side of the tape. Thus, the aspiring lead singer may listen to the entire professional group singing the selected song, and may sing along if desired. Alternatively, at the end of the second recording on the second side of tape 1, the aspiring lead singer may stop the play back apparatus and flip the tape again. This will place the aspiring lead singer at a spot on the tape for listening to the second recording on side 1 of the tape. Thus, the practice session may continue with the aspiring lead singer listening to the professional lead singer singing at a normal volume with the professional tenor/alto, baritone and bass singers singing at a significantly reduced volume.

The aspiring tenor/alto singer is provided with tape 2 for learning his or her part in the preferred rendition of the a cappella song on the system of tapes 10. More particularly, the tenor/alto singer listens to the first recording on the first side of tape 2 to hear all four members of the professional a cappella group singing simultaneously at substantially the preferred volume to learn how the entire aspiring group should sound.

The second recording on the first side of tape 2 differs from the second recording on the first side of tape 1. More particularly, the second recording on the first side of tape 2 provides the professional tenor performing at a normal volume with the professional lead, baritone and bass singers performing at a significantly reduced volume. As with tape 2, the second recording on the first side permits the aspiring tenor/alto singer to learn how his or her part should sound in the preferred rendition of the selected song while simultaneously teaching the aspiring tenor/alto singer what the other members of the group will be doing while he or she sings the appropriate tenor/alto part. The third recording on the first side of the second tape provides the professional lead, baritone and bass singers at their normal volume but without the professional tenor/alto singer. Thus, the aspiring tenor/alto singer may sing along with the professional lead, baritone and bass singers the part learned in the second recording on the first side of tape 2.

Upon the completion of the third recording on the first side of tape 2, an audible signal may be provided to the aspiring tenor/alto singer to flip the tape 2. The aspiring tenor/alto singer then listens to the first recording on the second side of tape 2 which is the same as the second recording on the first side of tape 2. Thus, the aspiring tenor/alto singer can listen to the professional tenor/alto singer sing at a normal volume, while the professional lead, baritone and bass singers perform at a significantly reduced volume. Thus, after just having performed with the professional lead, baritone and bass singers, the aspiring tenor/alto singer can listen to how his or her part should sound. The second recording on the second side of tape 2 is the same as the third recording on the first side of tape 2 and provides the professional lead, baritone and bass singers performing without the benefit of the professional tenor/alto singer. Thus, the aspiring tenor/alto singer can sing with his or her professional counterparts. The third recording on the second side of tape 2 is identical to the first recording on the first side of tape 2, and includes all four professional singers performing their rendition of the selected song. The aspiring tenor/alto singer may listen to this professional recording to be reminded of how the entire group should sound. Alternatively, the aspiring tenor/alto singer may flip tape 2 back to the first side at the end of the second recording of the second side and may again listen to the second recording on the first side.

The aspiring baritone and the aspiring bass use tapes 3 and 4 in a similar manner. As shown in Table 1, the first recording on the first side of tapes 3 and 4 are identical to the first recording on the first side of each of tapes 1 and 2. The second recording on the first side of tape 3 differs from the second recording on the first side of tapes 1 and 2 in that the professional baritone singer performs at a normal volume, while the professional lead singer, the professional tenor/alto singer and the professional bass singer perform at a significantly reduced volume. Similarly, the second recording on the first side of tape 4 provides the professional bass singer performing at a normal volume while the professional lead, tenor/alto and baritone singers format a significantly reduced volume. Thus, the aspiring baritone and bass singers learn their parts by listening to the second recording on the first side of the respective tapes 3 and 4.

The third recording on the first side of tapes 3 and 4 differ from one another and differ from the third recording on the first side of tapes 1 and 2 respectively. Specifically, the third recording on the first side of tape 3 provides the professional lead, tenor/alto and bass singers performing without the benefit of the baritone singer. Similarly, the third recording on the first side of tape 4 provides the professional lead, tenor/alto and baritone singers without the benefit of the professional bass singer. Thus, the third recording on the first side of tapes 3 and 4 enables the aspiring baritone and the aspiring bass singers to sing with their professional counterparts.

The second side of tapes 3 and 4 follow the same pattern as the second sides of tape 1 and tape 2 respectively. More particularly, the first recording on the second side of tape 3 is the same as the second recording on the first side of tape 3. The second recording on the second side of tape 3 is the same as the third recording on the first side of tape 3 and the third recording on the second side of tape 3 is the same as the first recording on the first side of tape 3.

In a similar manner, the first recording on the second side of tape 4 is the same as the second recording on the first side of tape 4, while the second recording on the second side of tape 4 is the same as the third recording on the first side of tape 4. The last recording on the second side of each of tapes 3 and 4 is the same as the last recording on the first side of all four tapes.

The system 10 of tapes 1–4 enables each member of an aspiring a cappella group to practice his or her part in a selected rendition of a new song without the burden of coordinating practice schedules with other members of the group. Thus, the members of an aspiring a cappella group merely pass out the tapes 1–4 to the respective lead, tenor/alto, baritone and bass singers so that they may practice the preferred rendition of the new song at their convenience. Either no practice or a much shorter amount of practice is therefore necessary when the various members of the aspiring group choose to perform the new song together.

An alternate embodiment of the subject invention is directed to a method for teaching a particular performance to a musical group or to a method for a musical group to learn a particular performance. The method requires a means for delivering musical tracks to at least one member of the musical group, and preferably to all members of the musical group. The means described in the preceding embodiment was a plurality of audio tapes. However, the preferred means, in accordance with the method of the invention, includes a single compact disc, a plurality of identical compact discs or a plurality of tracks downloaded to a personal computer through an internet service provider. The tracks provided on the compact disc or that are provided through the Internet to the personal computer are illustrated in Table 2 below. For purposes of this table, the parts identified in uppercase letters are intended to indicate normal volume. The parts presented in lowercase letters in Table 1 are intended to indicate an audible, but significantly reduced volume.

TABLE 2

| Track | NORMAL VOLUME/low volume parts |
|---|---|
| 1 | LEAD, TENOR, BARITONE, BASS |
| 2 | LEAD, tenor, baritone, bass |
| 3 | LEAD, TENOR, baritone, bass |
| 4 | lead, tenor, BARITONE, bass |
| 5 | lead, tenor, baritone, BASS |
| 6 | lead, TENOR, BARITONE, BASS |
| 7 | LEAD, tenor, BARITONE, BASS |
| 8 | LEAD, TENOR, baritone, BASS |
| 9 | LEAD, TENOR, BARITONE, bass |
| 10 | LEAD TENOR, BARITONE, BASS |

The method of the subject invention would employ the compact disc or the tracks downloaded from the Internet to sequentially have each performer listen first to all members of the musical group performing at a normal volume so that the performer learning a particular performance can hear how the performance is intended to sound by a professional group of performers who have practiced and learned the particular performance. The member of the group then would listen to the track that emphasizes his or her particular performance by playing his or her performance at a normal level while simultaneously playing the performances of the others at a substantially reduced volume. The performer then would play to a third track having his or her performance de-emphasized and played at a low volume while the other performers in the group are played at a normal volume. The performer could repeatedly switch back and forth between the tracks that emphasize and de-emphasize his or her particular performance. During the tracks where the single performance is de-emphasized, the performer could perform with the professional members of the musical group. Occasionally, the performer could switch back to the first or last track to hear how the performance is intended to sound by the complete group.

The arrangement of the tracks on a compact disk could vary from the arrangement illustrated in Table 2. For example, the tracks could be arranged so that each performer's emphasized performance could be followed immediately by that performer's de-emphasized performance. Such an arrangement of tracks would minimize the track switching required by a performer. Additionally, with the latter track arrangement, additional tracks could be incorporated with all members of the group performing simultaneously. Thus, the tracks could be arranged as set forth in Table 3.

TABLE 3

| Track | NORMAL VOLUME/low volume parts |
|---|---|
| 1 | LEAD, TENOR, BARITONE, BASS |
| 2 | LEAD, tenor, baritone, bass |
| 3 | lead, TENOR, BARITONE, BASS |

TABLE 3-continued

Track NORMAL VOLUME/low volume parts

| | |
|---|---|
| 4 | LEAD, TENOR, BARITONE, BASS |
| 5 | lead, TENOR, baritone, bass |
| 6 | LEAD, tenor, BARITONE, BASS |
| 7 | LEAD, TENOR, BARITONE, BASS |
| 8 | lead, tenor, BARITONE, bass |
| 9 | LEAD, TENOR, baritone, BASS |
| 10 | LEAD TENOR, BARITONE, BASS |
| 11 | lead, tenor, baritone, BASS |
| 12 | LEAD, TENOR, BARITONE, bass |

With this arrangement, the lead performer could listen repeatedly to tracks 1–3. The tenor could listen repeatedly to just tracks 4–6, the baritone could listen repeatedly to just tracks 7–9 and the bass could listen repeatedly to tracks 10–12. Similar sequencing of tracks could be achieved with versions that employ the method with the Internet. In particular, a performer could purchase and download from the Internet only those tracks that are of interest to that performer. Alternatively, the performer could purchase and download from the Internet all tracks identified in Table 2 or 3 and could listen to those tracks in the sequence described above merely by identifying the part of interest.

While the invention has been described with respect to a preferred embodiment, it is apparent that various changes can be made without departing from the scope of the invention as defined by the appended claims. For example, the compact disc or system of tapes may be employed by musical performers other than a cappella singing groups.

What is claimed is:

1. A method for teaching a musical performance to a group of musical performers, the method comprising:

providing at least a selected one of said performers with an audibly playable recording with a plurality of tracks having at least a first track with a performance performed by all members of a trained musical group, a second track with a performance by the selected performer at a normal volume and with performances by the other performers at a substantially reduced volume and a third track with the selected performance at a substantially reduced volume and the other performances at a normal volume; and playing the first track for the selected performer to learn how the entire performance should sound;

playing the second track for the selected performer to enable the selected performer to learn how the selected performance should sound; and playing the third track to enable the selected performer to perform simultaneously with the recording of members of the trained musical group at the normal volume.

2. The method of claim 1, further comprising the step of repeating the playing of the second and third tracks.

3. The method of claim 1, further comprising the step of repeating the playing of the fist track after the playing of the third track.

4. The method of claim 1, wherein the recording is provided on a compact disc, and wherein the method comprises playing the tracks of the compact disc.

5. The method of claim 1, wherein the pre-recorded tracks are provided via the Internet, and wherein the playing of the tracks is carried out by downloading the tracks from the Internet to a personal computer and playing the respective tracks through the personal computer.

6. The method of claim 1, wherein the pre-recorded tracks comprise separate tracks which emphasize each member of the musical group and separate tracks which respectively de-emphasize each member of the musical group, and wherein the method further comprises sequentially selecting the tracks that emphasize and de-emphasize the tracks of the selected performer.

7. A method of learning a musical performance for a member of a group of musical performers, the method comprising:

obtaining at least a selected one of said performers with an audibly playable recording with a plurality of tracks having at least a first track with a performance performed by all members of a trained musical group, a second track with a performance by the selected performer at a normal volume and with performances by the other performers at a substantially reduced volume and a third track with the selected performance at a substantially reduced volume and the other performances at a normal volume; and playing the first track to learn how the entire performance should sound;

playing the second track to learn how the member should complete the performance of the member; and playing the third track and simultaneously performing the members part.

8. The method of claim 7, further comprising the step of repeating the last two steps.

9. The method of claim 7, further comprising the step of repeating the last three steps.

10. The method of claim 7, wherein the recording is provided on a compact disc, and wherein the method comprises playing the tracks of the compact disc.

11. The method of claim 7, wherein the pre-recorded tracks are provided via the Internet, and wherein the playing of the tracks is carried out by downloading the tracks from the Internet to a personal computer and playing the respective tracks through the personal computer.

12. The method of claim 7, wherein the pre-recorded tracks comprise separate tracks which emphasize each member of the musical group and separate tracks which respectively de-emphasize each member of the musical group, and wherein the method further comprises sequentially selecting the tracks that emphasize and de-emphasize the tracks of the selected performer.

* * * * *